United States Patent
Kessel et al.

(10) Patent No.: US 10,951,015 B2
(45) Date of Patent: Mar. 16, 2021

(54) ELECTRICAL CONDUIT SYSTEM HAVING IMPROVED SEALING BETWEEN JOINTS

(71) Applicant: Robroy Industries—Texas, LLC, Gilmer, TX (US)

(72) Inventors: Amanda Lynn Kessel, League City, TX (US); Steven A. Voelzke, Longview, TX (US)

(73) Assignee: Robroy Industries—Texas, LLC, Gilmer, TX (US)

( * ) Notice: Subject to any disclaimer, the term of this patent is extended or adjusted under 35 U.S.C. 154(b) by 0 days.

(21) Appl. No.: 16/709,048

(22) Filed: Dec. 10, 2019

(65) Prior Publication Data
US 2020/0194979 A1  Jun. 18, 2020

Related U.S. Application Data

(60) Provisional application No. 62/779,881, filed on Dec. 14, 2018.

(51) Int. Cl.
*H02G 3/06* (2006.01)
*F16L 21/04* (2006.01)
*H01R 4/64* (2006.01)

(52) U.S. Cl.
CPC .............. *H02G 3/06* (2013.01); *F16L 21/045* (2013.01); *H01R 4/643* (2013.01)

(58) Field of Classification Search
CPC combination set(s) only.
See application file for complete search history.

(56) References Cited

U.S. PATENT DOCUMENTS

| | | | | |
|---|---|---|---|---|
| 497,990 A | * | 5/1893 | Simrell | F16L 15/003 285/332.2 |
| 1,116,609 A | * | 11/1914 | Mueller et al. | F16L 19/065 277/622 |
| 1,838,496 A | * | 12/1931 | Oven | F16J 15/128 277/592 |
| 1,888,539 A | * | 11/1932 | Otterson | F16L 17/02 285/108 |
| 2,245,154 A | * | 6/1941 | McWane | F16L 47/08 277/625 |
| 2,271,936 A | * | 2/1942 | Carson | F16L 13/122 285/285.1 |
| 2,272,812 A | * | 2/1942 | Neal | F16L 17/035 277/619 |
| 2,735,700 A | * | 2/1956 | Bowan et al. | F16L 19/061 277/623 |
| 2,953,398 A | * | 9/1960 | Haugen | F16L 17/035 277/625 |

(Continued)

*Primary Examiner* — William H. Mayo, III
*Assistant Examiner* — Krystal Robinson
(74) *Attorney, Agent, or Firm* — The Webb Law Firm (57) ABSTRACT

A joint fitting for an electrical conduit raceway may include a body including a first end and a second opposing end, at least one threaded section provided in the first end or the second end, at least one non-threaded section provided between the at least one threaded section and the corresponding first end or second end, the at least one non-threaded section defining a channel, and a sealing member positioned within the channel. Upon a radial compressive force being applied to the sealing member, at least a portion of the sealing member may protrude or extend from a terminal surface of the corresponding first end or second end.

20 Claims, 8 Drawing Sheets

(56) References Cited

U.S. PATENT DOCUMENTS

| | | | | |
|---|---|---|---|---|
| 3,150,889 A * | 9/1964 | Watts | F16L 15/003 | 285/332.2 |
| 3,184,247 A * | 5/1965 | Leutwyler | F16J 15/166 | 277/448 |
| 3,219,354 A * | 11/1965 | Kazienko | F16L 21/03 | 277/615 |
| 3,236,528 A * | 2/1966 | Bram | F16L 58/185 | 277/619 |
| 3,325,174 A * | 6/1967 | Weaver | F16L 21/03 | 277/604 |
| 3,741,570 A * | 6/1973 | Garrett | F16L 27/1017 | 277/625 |
| 4,078,813 A * | 3/1978 | Bram | F16L 21/03 | 277/616 |
| 4,084,827 A * | 4/1978 | Wolf | F16L 21/022 | 277/607 |
| 4,108,481 A * | 8/1978 | Graham | F16L 21/03 | 285/231 |
| 4,223,895 A * | 9/1980 | Roberts, Jr. | F16L 17/035 | 277/625 |
| 4,389,123 A * | 6/1983 | Horikoshi | G04B 23/028 | 340/391.1 |
| 4,432,394 A * | 2/1984 | Martin | F16L 57/005 | 138/89 |
| 4,842,062 A * | 6/1989 | Schneider | E21B 33/16 | 166/154 |
| 4,930,816 A * | 6/1990 | Biing-Yih | B25B 13/02 | 285/133.4 |
| 5,078,432 A * | 1/1992 | Seiter | F16L 39/00 | 285/124.3 |
| 5,087,083 A * | 2/1992 | Usui | F16L 13/0236 | 285/21.1 |
| 5,297,824 A * | 3/1994 | Imhof | F16L 37/0925 | 285/322 |
| 5,352,383 A * | 10/1994 | Johnson | C10M 129/50 | 252/389.62 |
| 5,504,650 A * | 4/1996 | Katsui | G06F 1/20 | 361/697 |
| 6,173,968 B1 * | 1/2001 | Nelson | F16J 15/166 | 277/584 |
| 6,622,786 B1 * | 9/2003 | Calmidi | F28F 3/022 | 165/122 |
| 7,182,372 B2 * | 2/2007 | Wolff | F16L 21/03 | 277/604 |
| 9,383,045 B2 * | 7/2016 | Santi | F16L 15/003 |
| 10,006,572 B2 * | 6/2018 | Kishi | F16L 27/1275 |
| 10,367,344 B2 * | 7/2019 | Smith | H02G 3/0691 |
| 2007/0017688 A1 * | 1/2007 | Pyron | H01R 13/5219 | 174/59 |
| 2010/0181727 A1 * | 7/2010 | Santi | F16L 17/02 | 277/314 |
| 2010/0187808 A1 * | 7/2010 | Santi | E21B 17/042 | 285/106 |
| 2011/0147081 A1 * | 6/2011 | Best | H02G 3/0633 | 174/84 R |
| 2011/0233923 A1 | 9/2011 | Pina et al. | | |
| 2013/0119659 A1 * | 5/2013 | Williams | F16L 37/0887 | 285/374 |
| 2015/0239339 A1 * | 8/2015 | Nakamura | B60K 15/04 | 285/355 |
| 2015/0300541 A1 * | 10/2015 | Nielinger | F16L 15/04 | 285/66 |
| 2015/0337633 A1 * | 11/2015 | Legrand | E21B 47/017 | 166/276 |
| 2019/0249810 A1 * | 8/2019 | Tanner | F16L 55/1608 | |

* cited by examiner

ELECTRICAL CONDUIT SYSTEM HAVING IMPROVED SEALING BETWEEN JOINTS

CROSS REFERENCE TO RELATED APPLICATIONS

This application claims the benefit of U.S. Provisional Patent Application No. 62/779,881, filed Dec. 14, 2018, the disclosure of which is incorporated in its entirety by reference.

BACKGROUND OF THE INVENTION

Field of the Invention

The present disclosure is generally directed to electrical conduit systems and, more particularly, to electrical conduit systems with hygienic sealing arrangements.

Description of Related Art

Conduit is a well-known protective covering and routing path for use with electrical wire and cable in both commercial and residential applications. Electrical installments utilizing conduit typically include lengths of conduit connected by various types of fittings. Conduit is offered in a variety of metal, plastic, and composite materials, and is selected based on the needs of a particular application. Additionally, a multitude of governing bodies promulgate regulations requiring that conduit used in specific applications meets certain minimum requirements. For example, in certain applications, metal conduit and conduit fittings must maintain a minimum level of sterility to prevent corrosion, contamination and bacteria growth thereon.

In specific applications, conduit is used in the food and beverage industry to form "raceways" that hold electrical wire and cable that provide power to certain machines and appliances in food processing facilities, restaurants, or bar kitchens, or similar facilities. Since the conduit may be placed in relatively close proximity to production equipment or tables on which food or beverages may be processed, prepared, or stored, regulations are in place that require the conduit maintain a minimum level of sterility to avoid corrosion, contamination, and/or growth of bacteria thereon, which could transfer to any food or beverage being prepared or stored on adjacent surfaces. However, quite often conduit and conduit fittings will permit such corrosion, contamination, and/or bacteria growth to develop therein. Due to condensation and possible contact with the food and/or beverage, bacteria and/or contamination of the joint fitting between portions of the conduit often occurs. Water may seep into the joint fitting between the connecting portions of the conduit helping bacteria to grow therein. Most joint fittings of conduit used in the food and beverage industry do not include features to assist in ensuring that water is directed away from the joint fitting to prevent corrosion, contamination, and bacteria growth.

SUMMARY OF THE INVENTION

In view of the foregoing, there is a current need in the food and beverage industry for conduit and joint fittings for conduits that reduce the risk of corrosion, contamination, and bacteria growth thereon. There is a current need for a joint fitting of conduit that sheds or directs water and other fluids away from the joint fitting of the conduit to prevent corrosion, contamination, and bacteria growth within the joint fitting.

In one example of the present disclosure, a joint fitting for an electrical conduit raceway may include a body including a first end and a second opposing end, at least one threaded section provided in the first end or the second end, at least one non-threaded section provided between the at least one threaded section and the corresponding first end or second end, the at least one non-threaded section defining a channel, and a sealing member positioned within the channel. Upon a radial compressive force being applied to the sealing member, at least a portion of the sealing member may protrude or extend from a terminal surface of the corresponding first end or second end.

In another example of the present disclosure, the sealing member may be an O-ring. A protrusion may extend inwardly within the at least one non-threaded section such that two grooves are defined in the at least one non-threaded section. The sealing member may include an O-ring comprising two separate portions separated by a channel. The channel may be structured so as to form a U-shaped channel. The channel may be structured so as to form an L-shaped channel that permits a portion of the sealing member to be exposed from the respective first end or the second end. A first portion of the O-ring may be held in a first groove of the non-threaded section and a second portion of the O-ring may be held in a second groove of the non-threaded section in which a portion of the second portion of the O-ring is exposed at the respective first end or second end of the body.

In another example of the present disclosure, an electrical conduit raceway system may include a joint fitting, at least one conduit portion threadedly connected to the joint fitting, and an electrical wire or cable extending through the at least one conduit portion and the joint fitting. The joint fitting may include a body including a first end and a second opposing end, at least one threaded section provided in the first end or the second end, at least one non-threaded section provided between the at least one threaded section and the corresponding first end or second end, the at least one non-threaded section defining a channel, and a sealing member positioned within the channel. Upon a radial compressive force being applied to the sealing member, at least a portion of the sealing member may protrude or extend from a terminal surface of the corresponding first end or second end.

In another example of the present disclosure, the sealing member may be an O-ring. A protrusion may extend inwardly within the at least one non-threaded section such that two grooves are defined in the at least one non-threaded section. The sealing member may include an O-ring comprising two separate portions separated by a channel. The channel may be structured so as to form a U-shaped channel. The channel may be structured so as to form an L-shaped channel that permits a portion of the sealing member to be exposed from the respective first end or the second end. A first portion of the O-ring may be held in a first groove of the non-threaded section and a second portion of the O-ring may be held in a second groove of the non-threaded section in which a portion of the second portion of the O-ring is exposed at the respective first end or second end of the body.

In another example of the present disclosure, a method of assembling an electrical conduit raceway system may include providing a conduit portion; providing a joint fitting, wherein the joint fitting comprises a sealing member positioned within a channel formed within the joint fitting; threading the conduit portion into the joint fitting such that a radial compressive force is applied to the sealing member causing at least a portion of the sealing member to protrude or extend from a terminal surface of the corresponding first end or second end; and inserting an electrical wire or cable through the conduit portion and the joint fitting.

In another example of the present disclosure, the sealing member may be an O-ring. A protrusion may extend inwardly within the at least one non-threaded section such that two grooves are defined in the at least one non-threaded section. The sealing member may include an O-ring comprising two separate portions separated by a channel. The channel may be structured so as to form a U-shaped channel. The channel may be structured so as to form an L-shaped channel that permits a portion of the sealing member to be exposed from the respective first end or the second end.

The following clauses also define the present invention:

Clause 1: A joint fitting for an electrical conduit raceway, comprising: a body including a first end and a second opposing end; at least one threaded section provided in the first end or the second end; at least one non-threaded section provided between the at least one threaded section and the corresponding first end or second end, the at least one non-threaded section defining a channel; and a sealing member positioned within the channel, wherein, upon a radial compressive force being applied to the sealing member, at least a portion of the sealing member protrudes or extends from a terminal surface of the corresponding first end or second end.

Clause 2: The joint fitting of Clause 1, wherein the sealing member is an O-ring.

Clause 3: The joint fitting of Clause 1, wherein a protrusion extends inwardly within the at least one non-threaded section such that two grooves are defined in the at least one non-threaded section.

Clause 4: The joint fitting of Clause 1, wherein the sealing member comprises an O-ring comprising two separate portions separated by a channel.

Clause 5: The joint fitting of Clause 1, wherein the channel is structured so as to form a U-shaped channel.

Clause 6: The joint fitting of Clause 1, wherein the channel is structured so as to form an L-shaped channel that permits a portion of the sealing member to be exposed from the respective first end or the second end.

Clause 7: The joint fitting of Clause 1, wherein a protrusion extends inwardly within the at least one non-threaded section such that two grooves are defined in the at least one non-threaded section, wherein the sealing member comprises an O-ring comprising two separate portions separated by a channel, and wherein a first portion of the O-ring is held in a first groove of the non-threaded section and a second portion of the O-ring is held in a second groove of the non-threaded section in which a portion of the second portion of the O-ring is exposed at the respective first end or second end of the body.

Clause 8: An electrical conduit raceway system, comprising: a joint fitting; at least one conduit portion threadedly connected to the joint fitting; and an electrical wire or cable extending through the at least one conduit portion and the joint fitting, wherein the joint fitting comprises: a body including a first end and a second opposing end; at least one threaded section provided in the first end or the second end; at least one non-threaded section provided between the at least one threaded section and the corresponding first end or second end, the at least one non-threaded section defining a channel; and a sealing member positioned within the channel, and wherein, upon a radial compressive force being applied to the sealing member, at least a portion of the sealing member protrudes or extends from a terminal surface of the corresponding first end or second end.

Clause 9: The electrical conduit raceway system of Clause 8, wherein the sealing member is an O-ring.

Clause 10: The electrical conduit raceway system of Clause 8, wherein a protrusion extends inwardly within the at least one non-threaded section such that two grooves are defined in the at least one non-threaded section.

Clause 11: The electrical conduit raceway system of Clause 8, wherein the sealing member comprises an O-ring comprising two separate portions separated by a channel.

Clause 12: The electrical conduit raceway system of Clause 8, wherein the channel is structured so as to form a U-shaped channel.

Clause 13: The electrical conduit raceway system of Clause 8, wherein the channel is structured so as to form an L-shaped channel that permits a portion of the sealing member to be exposed from the respective first end or the second end.

Clause 14: The electrical conduit raceway system of Clause 8, wherein a protrusion extends inwardly within the at least one non-threaded section such that two grooves are defined in the at least one non-threaded section, wherein the sealing member comprises an O-ring comprising two separate portions separated by a channel, and wherein a first portion of the O-ring is held in a first groove of the non-threaded section and a second portion of the O-ring is held in a second groove of the non-threaded section in which a portion of the second portion of the O-ring is exposed at the respective first end or second end of the body.

Clause 15: A method of assembling an electrical conduit raceway system, the method comprising: providing a conduit portion; providing a joint fitting, wherein the joint fitting comprises a sealing member positioned within a channel formed within the joint fitting; threading the conduit portion into the joint fitting such that a radial compressive force is applied to the sealing member causing at least a portion of the sealing member to protrude or extend from a terminal surface of the corresponding first end or second end; and inserting an electrical wire or cable through the conduit portion and the joint fitting.

Clause 16: The method of Clause 15, wherein the sealing member is an O-ring.

Clause 17: The method of Clause 15, wherein a protrusion extends inwardly within the channel such that two grooves are defined in the channel.

Clause 18: The method of Clause 15, wherein the sealing member comprises an O-ring comprising two separate portions separated by a channel.

Clause 19: The method of Clause 15, wherein the channel is structured so as to form a U-shaped channel.

Clause 20: The method of Clause 15, wherein the channel is structured so as to form an L-shaped channel that permits a portion of the sealing member to be exposed from the respective first end or the second end.

These and other features and characteristics of the electrical conduit raceway system, as well as the methods of operation and functions of the related elements of the system, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the disclosure. As used in the specification and claims, the singular form of "a", "an", and "the" include plural referents unless the context clearly dictates otherwise.

DESCRIPTION OF THE INVENTION

For purposes of the description hereinafter, the terms "upper", "lower", "right", "left", "vertical", "horizontal", "top", "bottom", "lateral", "longitudinal", and derivatives thereof, shall relate to the invention as it is oriented in the figures. However, it is to be understood that the invention may assume alternative variations and step sequences, except where expressly specified to the contrary. It is also to be understood that the specific systems and processes illustrated in the attached drawings, and described in the following specification, are simply exemplary examples of the invention. Hence, specific dimensions and other physical characteristics related to the examples disclosed herein are not to be considered as limiting.

Referring to the drawings in which like reference numerals refer to like parts throughout the several views thereof, the present disclosure is generally directed to an electrical conduit system for holding electric wiring or cable and, more particularly, to an electrical conduit system having a joint fitting that includes features for reducing or eliminating corrosion, contamination, and/or bacteria growth on the joint fitting and the conduit.

Figure 1:
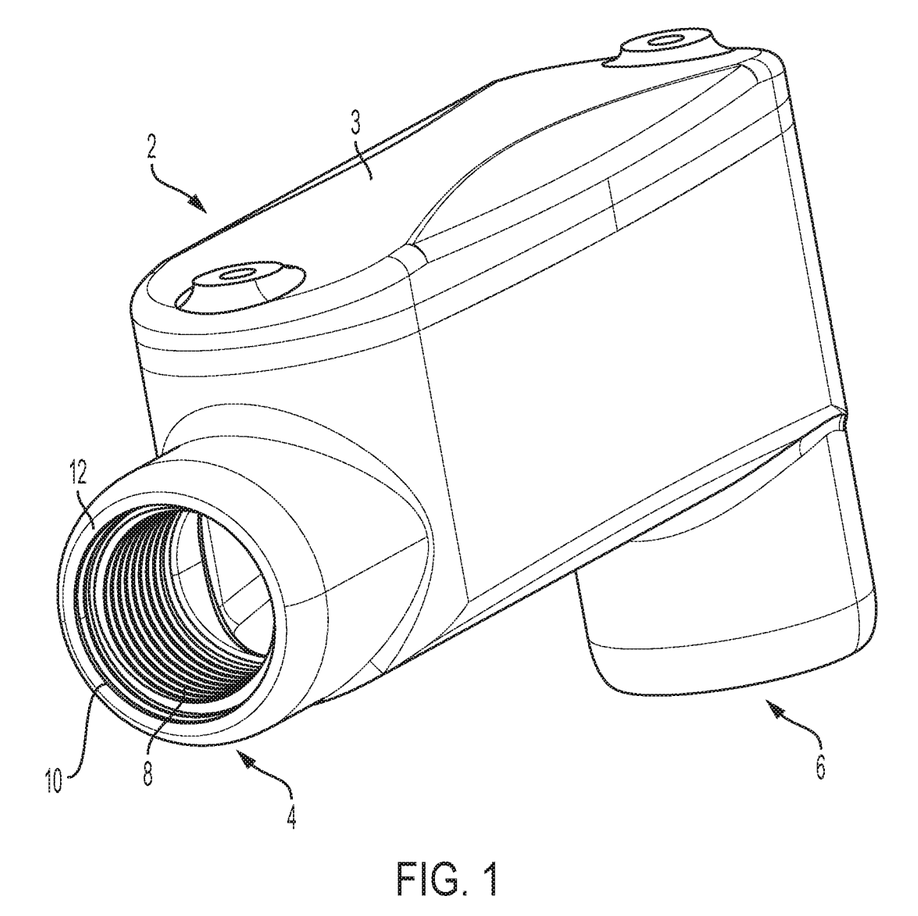
FIG. 1 is a perspective view of a joint fitting of a conduit according to one example of the present disclosure.
Figure 2:
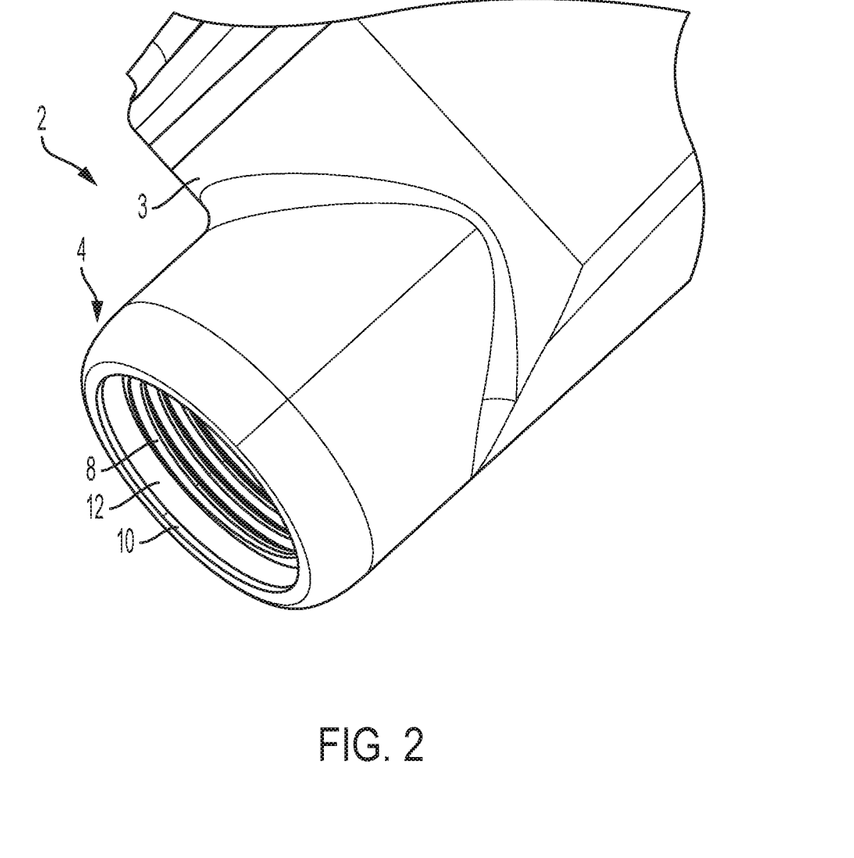
FIG. 2 is another perspective view of the joint fitting of FIG. 1.
Figure 3:
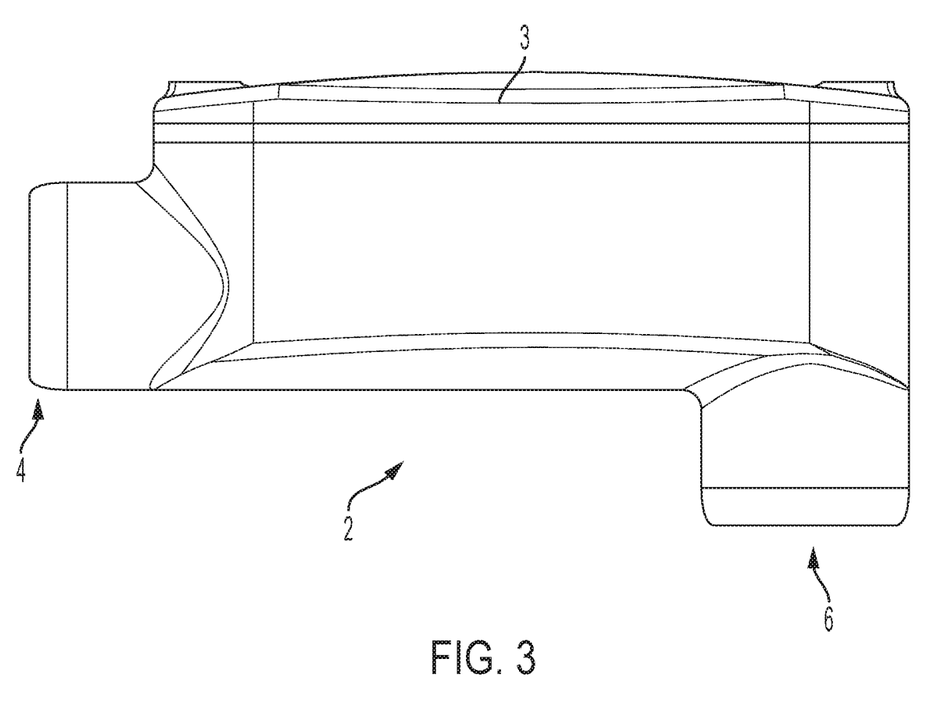
FIG. 3 is a side view of the joint fitting of FIG. 1.

With reference to FIGS. 1-3, a first example of a joint fitting 2 of the present disclosure is shown and described. The joint fitting 2 may include a body 3 that includes a first end 4 for connection to a first portion of conduit (not shown) and a second end 6 for connection to a second portion of conduit (not shown). The joint fitting 2 may define a central passageway to permit electric wire or cable to pass therethrough into the conduit portions. Each end 4, 6 of the body 3 includes an internally threaded portion 8 to connect the joint fitting 2 to the conduit portions. Each end 4, 6, may also include a non-threaded portion 10 that is provided between the threaded portion 8 and the opening of each end 4, 6. The non-threaded portion 10 defines a channel to receive an O-ring 12 or some other sealing element therein. The O-ring 12 is configured to create a liquid tight seal between the joint fitting 2 and the conduit portion held in the joint fitting 2. In one example, the channel defined in the non-threaded portion 10 is substantially U-shaped. The design of the sealing element is made so the joint fitting 2 is permitted to be positioned for the direction required for installation of the conduit system. This requirement is accomplished by the width of the sealing member (at least one complete revolution) and the engagement of the thread standard within the joint fitting 2.

With reference to FIGS. 4-7, a second example of a joint fitting 20 of the present disclosure is shown and described. This example of the joint fitting 20 includes similar features as the joint fitting 2 described above. The joint fitting 20 may include a body 22 having a first end 24 and an opposing second end 26. The body 22 may also define a central passageway 28 that extends therethrough to permit electric wiring or cable to pass therethrough from a first conduit portion 100 to a second conduit portion. The first conduit portion 100 (shown in FIGS. 5-7) may be connected to the first end 24 of the joint fitting 20 and the second conduit portion (not shown) may be connected to the second end 26 of the joint fitting 20.

Figure 4:
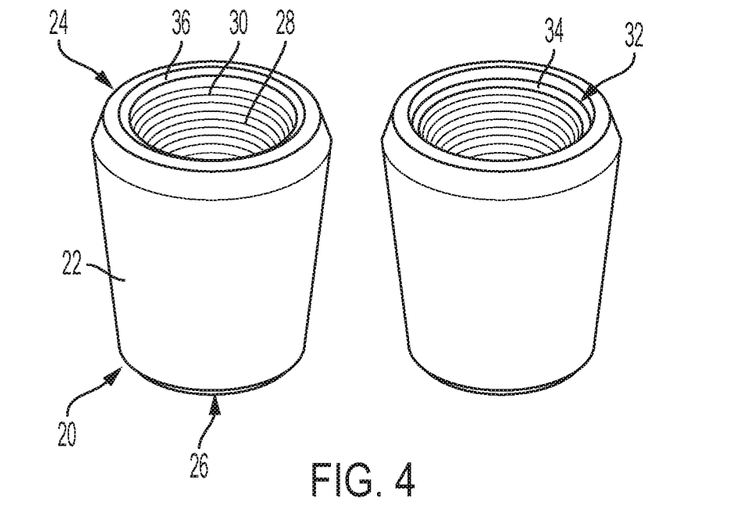
FIG. 4 is a perspective view of a joint fitting according to one example of the present disclosure showing an O-ring installed in the joint fitting and an O-ring removed from the joint fitting.
Figure 5:
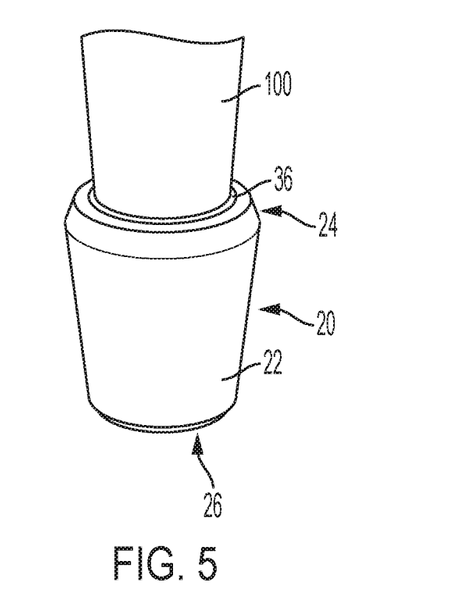
FIG. 5 is a perspective view of the joint fitting of FIG. 4 connected to another portion of conduit.
Figure 6:
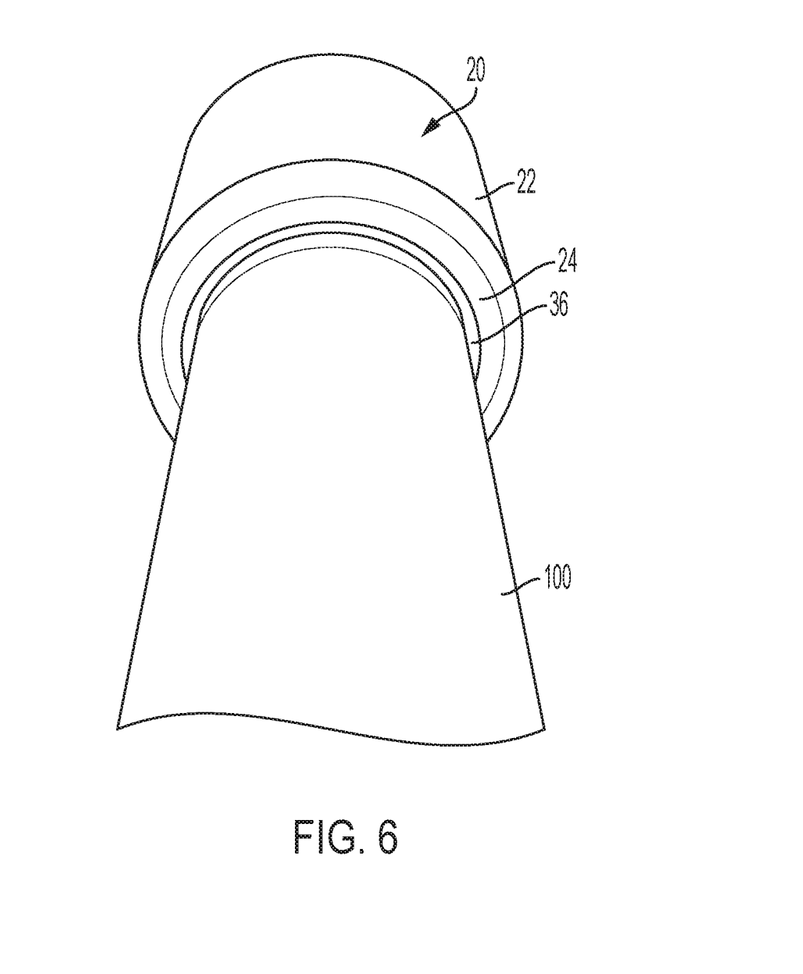
FIG. 6 is another perspective view of the joint fitting of FIG. 4 connected to another portion of conduit.
Figure 7:
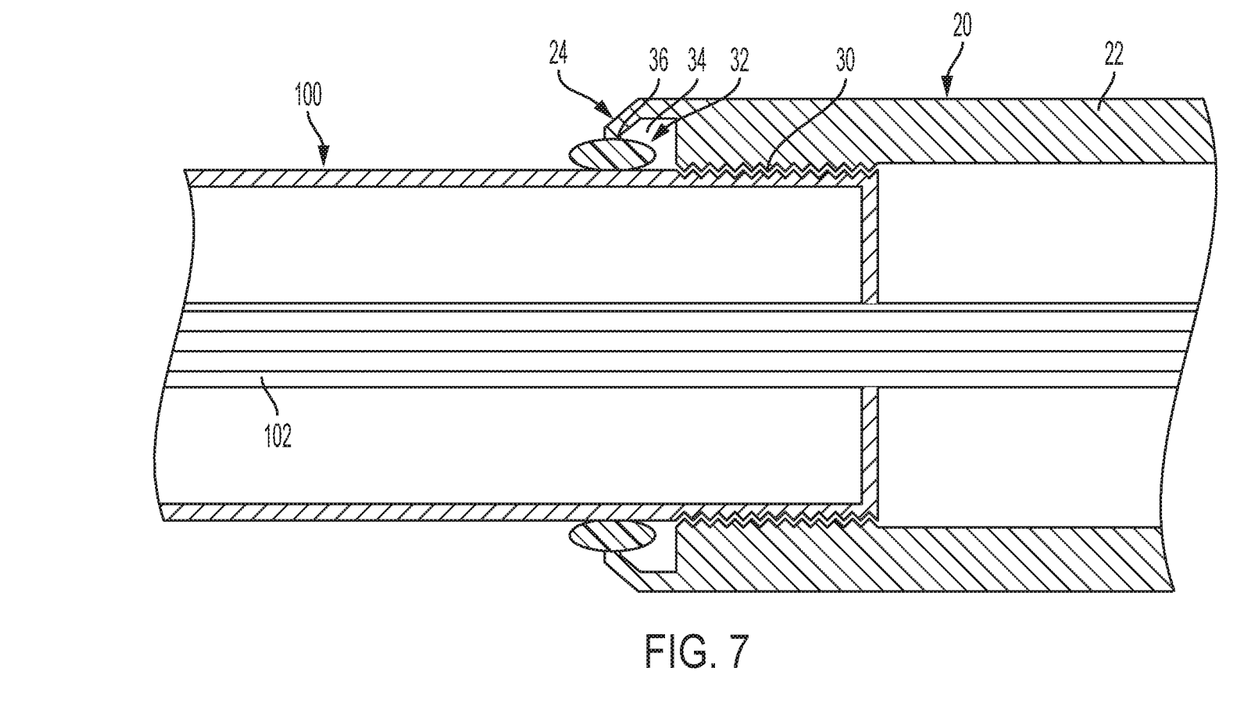
FIG. 7 is a cross-sectional view of the joint fitting of FIG. 4 connected to another portion of conduit.
Figure 8:
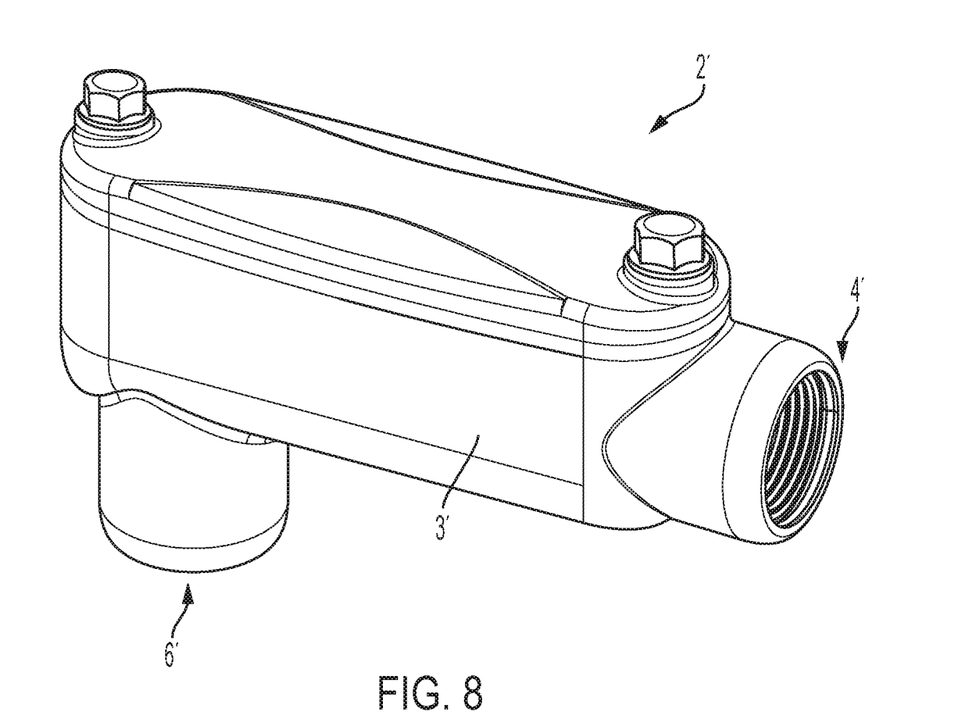
FIG. 8 is a perspective view of a joint fitting of a conduit according to another example of the present disclosure.
Figure 9:
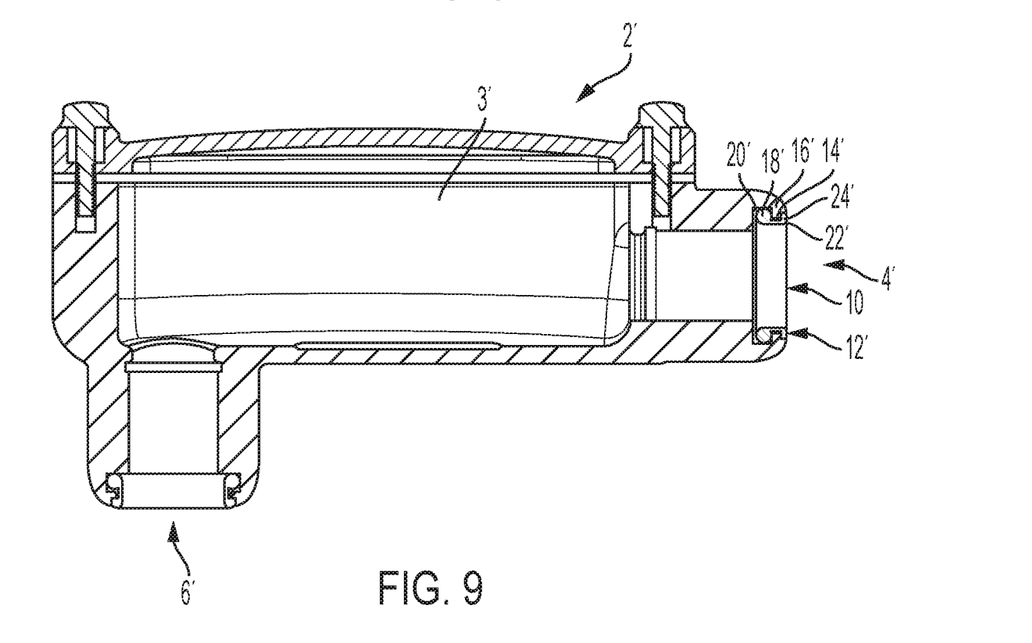
FIG. 9 is a cross-sectional view of the joint fitting of FIG. 8.
Figure 10:
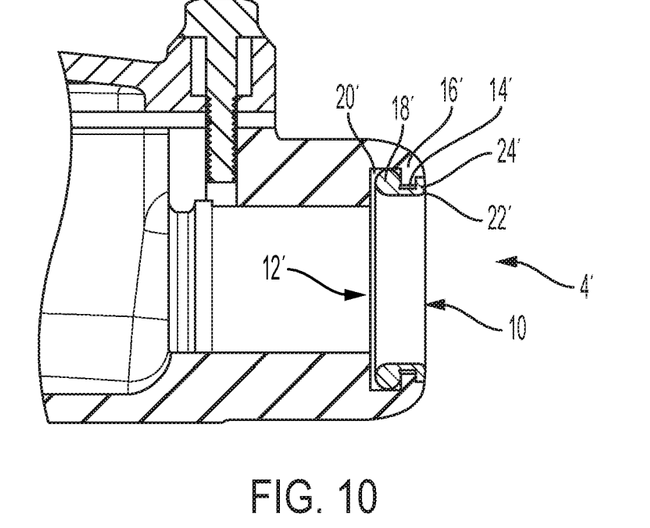
FIG. 10 is an isolated cross-sectional view of the joint fitting of FIG. 8.

As shown in FIG. 4, the joint fitting 20 may include a threaded portion 30 defined in each end 24, 26 thereof. The threaded portions 30 are provided to permit the first and second conduits to be threadedly connected to the first and second ends 24, 26, respectively, of the joint fitting 20 to create a "raceway" for the electric cable or wire 102 to extend from the first conduit portion 100 through the joint fitting 20 and into the second conduit portion. A "raceway" system forms a physical pathway for electrical wiring or cable to protect the electrical wires and cables from heat, humidity, corrosion, water intrusion, and general physical threats. The joint fitting 20 is also third party certified to provide a degree of protection against falling dirt, rain, sleet, snow, windblown dust, splashing water, hose-directed water, and corrosion. It is specifically noted that the joint fitting 20 is a means for securing conduit, cable, or tubing to an enclosure, box, or raceway system. A threaded coupling is an internally threaded cylinder that connects two lengths of a raceway. Electrical conduits and raceway systems are constructed according to the UL 6 Electrical Rigid Metal Conduit—Steel and UL 6A Electrical Rigid Metal Conduit—Aluminum, Red Brass, and Stainless Steel standards. Terminal ends of the conduit portions may have a corresponding threaded section to threadedly connect to the joint fitting 20. Each end 24, 26 of the joint fitting 20 may also include a non-threaded section 32. In one example, the non-threaded section 32 is positioned between the threaded section 30 and the opening defined in the ends 24, 26. As shown in FIG. 7, the non-threaded section 32 may define a channel 34 to receive an O-ring 36 or other sealing element therein to create a water tight seal between the joint fitting 20 and the first and second conduit portions when the electrical conduit raceway system is fully assembled. In one example, the channel 34 is substantially L-shaped such that a portion of the O-ring 36 may be exposed on the end 24, 26 of the joint fitting 20. The portions of the joint fitting 20 are subjected to a stream of water from a hose that has a 25 mm inside diameter (1 inch inside diameter) nozzle that delivers at least 240 L per minute (65 gallons per minute). The water shall be directed at all joints from a distance of 3.0-3.5 m (10-12 feet). The nozzle shall be moved along each joint one time at a uniform nominal rate of 6 mm/s (¼ inch per second).

As shown in FIG. 7, since the non-threaded section 32 of the joint fitting 20 is positioned closest to the opening of the ends 24, 26, the O-ring 36 held in the non-threaded section 32 can rest against a smooth, planar surface on the conduit portions, instead of being tightened on the threaded section of the conduit portions. Since the O-ring 36 seals against the smooth, planar surface of the outer circumference of the conduit portions 100, a stronger, tighter seal is created between the joint fitting 20 and the conduit portion 100. Unlike in conduit assemblies in which the O-ring is sealed against a threaded portion of the conduit, no water is permitted to seep into the joint fitting 20 through the threads in the threaded section 30 of the joint fitting 20. Instead, the O-ring 36 directs all water away from the joint fitting 20, and is considered to have met the industry requirements if no water has entered, thereby reducing the risk of corrosion, contamination, and/or bacteria growth within the joint fitting 20. With continued reference to FIG. 7, it is also noted that, as the conduit portions 100 are threaded into the joint fitting 20, the O-ring 36 may compress radially such that at least a portion of the O-ring 36 extends axially out of the opening defined in the ends 24, 26. This extended portion of the O-ring 36 acts as a water shedding feature that directs any water that is flowing towards the joint fitting 20 away from the joint fitting 20. As water flows over the joint fitting 20, the water is directed away from the connection between the joint fitting 20 and the conduit portion 100 due to the extended portion of the O-ring 36 shedding or pushing the water away from the joint between these two components. It is also to be understood that the seal created by the O-ring 36 remains water-tight, even when exposed to high pressure, high temperature water and is able to withstand high-pressure and steam cleaning. The sealing arrangement provided by the O-ring 36 is designed and configured to prevent any ingress of dust and/or water into the joint fitting 2, 20. Certification specifies a spray nozzle that is fed with 80° C. water at 80-100 bar (1160-1450) and a flow rate of 14-16 L/min. The nozzle is held 10-15 cm at angles of 0°, 30°, 60° and 90° for 30 seconds each, rotating once every 12 seconds. It is deemed acceptable if there is no ingress of water.

The advantages provided by using the joint fittings 2, 20 are described in further detail. In one example, the joint fittings 2, 20 may be made of stainless steel to provide extra corrosion resistance. The joint fittings 2, 20 may also be shaped to increase and enhance the water shedding features of the joint fitting 2, 20. In particular, in one example, the joint fittings 2, 20 have no flat surfaces, no recesses or crevices, and no exposed threads such that any water that flows over or is directed towards the fittings 2, 20 is shed off or directed away from the joint fitting 2, 20 to reduce any risk of contamination, corrosion, or bacteria growth on the joint fitting 2, 20. It is also contemplated that several different types of finishes may be used on the joint fittings 2, 20 including a polished finish or a machine finish. Any labels provide on the joint fitting 2, 20 may be laser marked or annealed thereon to maintain the smooth outer surface of the joint fitting 2, 20.

With reference to FIGS. 8-12, another example of a joint fitting 2' of the present disclosure is shown and described. The joint fitting 2' may include a body 3' that includes a first end 4' for connection to a first portion of conduit (not shown) and a second end 6' for connection to a second portion of conduit (not shown). The joint fitting 2' may define a central passageway to permit electric wire or cable to pass therethrough into the conduit portions. Each end 4', 6' of the body 3' includes an internally threaded portion 8' to connect the joint fitting 2' to the conduit portions. Each end 4', 6', may also include a non-threaded portion 10' that is provided between the threaded portion 8' and the opening of each end 4', 6'. The non-threaded portion 10' defines a channel to receive an O-ring 12' or some other sealing element therein. The O-ring 12' is configured to create a liquid tight seal between the joint fitting 2' and the conduit portion held in the joint fitting 2'.

As shown in FIGS. 9-12, the O-ring 12' may define a circumferential channel 14' that receives a protrusion 16' extending inwardly from the non-threaded portion 10' of the joint fitting 2'. In one example, the O-ring 12' has a first portion 18' provided in a channel 20' defined in the non-threaded portion 10' and a second portion 22' provided in a groove 24' defined in an end of the non-threaded portion 10'. The first portion 18' and the second portion 22' are separated by the channel 14' defined in the O-ring 12'. In one example, each end 4', 6' of the joint fitting 2' may include an O-ring 12'.

Figure 11:
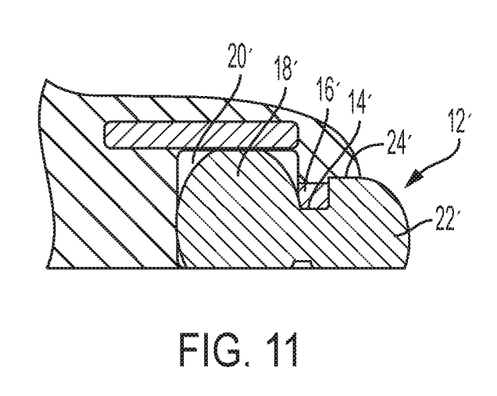
FIG. 11 is an isolated cross-sectional view of the joint fitting of FIG. 8 when connected to a conduit.
Figure 12:
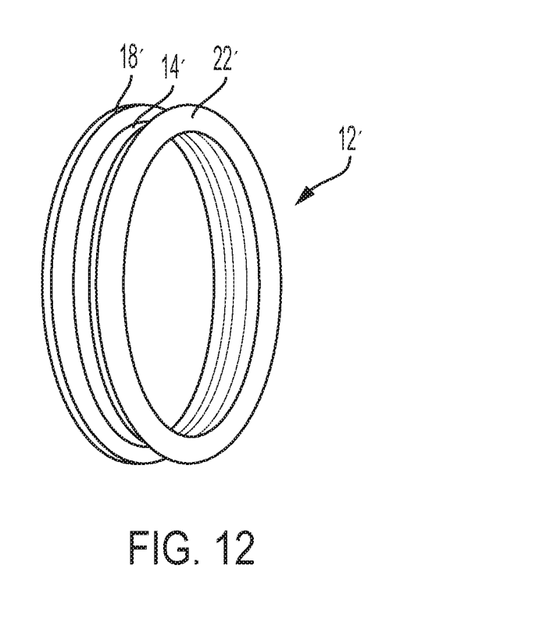
FIG. 12 is a perspective view of an O-ring or gasket used in the joint fitting of FIG. 8.

As shown in FIG. 11, since the non-threaded section 10' of the joint fitting 2' is positioned closest to the opening of the ends 4', 6', the O-ring 12' held in the non-threaded section 10' can rest against a smooth, planar surface on the conduit portions, instead of being tightened on the threaded section of the conduit portions. Since the O-ring 12' seals against the smooth, planar surface of the outer circumference of the conduit portions, a stronger, tighter seal is created between the joint fitting 2' and the conduit portion. Unlike in conduit assemblies in which the O-ring is sealed against a threaded portion of the conduit, no water is permitted to seep into the joint fitting 2' through the threads in the threaded section 8' of the joint fitting 2'. Instead, the O-ring 12' is front flush in the installed condition and directs all water away from the joint fitting 2', thereby reducing the risk of corrosion, contamination, and/or bacteria growth within the joint fitting 2'. With continued reference to FIG. 11, it is also noted that, as the conduit portions are threaded into the joint fitting 2', the O-ring 12' may compress radially such that at least a portion of the O-ring 12' extends axially out of the opening defined in the ends 4', 6'. This extended portion of the O-ring 12' acts as a water shedding feature that directs any water that is flowing towards the joint fitting 2' away from the joint fitting 2'. As water flows over the joint fitting 2', the water is directed away from the connection between the joint fitting 2' and the conduit portion due to the extended portion of the O-ring 12' shedding or pushing the water away from the joint between these two components. It is also to be understood that the seal created by the O-ring 12' remains water-tight, even when exposed to high pressure, high temperature water. The sealing arrangement provided by the O-ring 12' is designed and configured to prevent any ingress of water into the joint fitting 2'.

In another example of the present disclosure, a method of assembling an electrical conduit raceway system is disclosed. Using this method, the electrical conduit raceway system may be assembled to hold an electrical wire or cable. The following method may be used to form an electrical conduit raceway system using any of the joint fittings described above. Therefore, specific reference numerals for the specific components are not provided with the following description. In a first step of the method, a conduit portion may be provided. A joint fitting may then be provided. In one example, the joint fitting may include a sealing member positioned within a channel formed within the joint fitting. The conduit portion may then be threaded into the joint fitting such that a radial compressive force is applied to the sealing member causing at least a portion of the sealing member to protrude or extend from a terminal surface of the corresponding first end or second end. The electrical wire or cable may then be inserted through the conduit portion and the joint fitting. It is to be understood that the method may alternatively include threading the electrical wire or cable through the conduit portion before threading the conduit portion to the joint fitting.

While several examples of the joint fitting and the electrical conduit raceway system are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A joint fitting for an electrical conduit raceway, comprising:
    a body including a first end and a second opposing end;
    at least one threaded section provided in the first end or the second end;
    at least one non-threaded section provided between the at least one threaded section and the corresponding first end or second end, the at least one non-threaded section defining a channel; and
    a sealing member positioned within the channel,
    wherein the sealing member is dimensioned such that, in a first position, an end of the sealing member is housed within the corresponding first end or second end, and
    wherein the sealing member is dimensioned such that, in a second position and upon a radial compressive force being applied to the sealing member, the same end of the sealing member protrudes or extends from a terminal surface of the corresponding first end or second end.

2. The joint fitting of claim 1, wherein the sealing member is an O-ring.

3. The joint fitting of claim 1, wherein a protrusion extends inwardly within the at least one non-threaded section such that two grooves are defined in the at least one non-threaded section.

4. The joint fitting of claim 1, wherein the sealing member comprises an O-ring comprising two separate portions separated by a channel.

5. The joint fitting of claim 1, wherein the channel is structured so as to form a U-shaped channel.

6. The joint fitting of claim 1, wherein the channel is structured so as to form an L-shaped channel that permits a portion of the sealing member to be exposed from the respective first end or the second end.

7. The joint fitting of claim 1,
    wherein a protrusion extends inwardly within the at least one non-threaded section such that two grooves are defined in the at least one non-threaded section,
    wherein the sealing member comprises an O-ring comprising two separate portions separated by a channel, and
    wherein a first portion of the O-ring is held in a first groove of the non-threaded section and a second portion of the O-ring is held in a second groove of the non-threaded section in which a portion of the second portion of the O-ring is exposed at the respective first end or second end of the body.

8. An electrical conduit raceway system, comprising:
    a joint fitting;
    at least one conduit portion threadedly connected to the joint fitting; and
    an electrical wire or cable extending through the at least one conduit portion and the joint fitting,
    wherein the joint fitting comprises:
        a body including a first end and a second opposing end;
        at least one threaded section provided in the first end or the second end;
        at least one non-threaded section provided between the at least one threaded section and the corresponding first end or second end, the at least one non-threaded section defining a channel; and
        a sealing member positioned within the channel, and
    wherein the sealing member is dimensioned such that, in a first position, an end of the sealing member is housed within the corresponding first end or second end, and
    wherein the sealing member is dimensioned such that, in a second position and upon a radial compressive force being applied to the sealing member, the same end of the sealing member protrudes or extends from a terminal surface of the corresponding first end or second end.

9. The electrical conduit raceway system of claim 8, wherein the sealing member is an O-ring.

10. The electrical conduit raceway system of claim 8, wherein a protrusion extends inwardly within the at least one non-threaded section such that two grooves are defined in the at least one non-threaded section.

11. The electrical conduit raceway system of claim 8, wherein the sealing member comprises an O-ring comprising two separate portions separated by a channel.

12. The electrical conduit raceway system of claim 8, wherein the channel is structured so as to form a U-shaped channel.

13. The electrical conduit raceway system of claim 8, wherein the channel is structured so as to form an L-shaped channel that permits a portion of the sealing member to be exposed from the respective first end or the second end.

14. The electrical conduit raceway system of claim 8,
    wherein a protrusion extends inwardly within the at least one non-threaded section such that two grooves are defined in the at least one non-threaded section,
    wherein the sealing member comprises an O-ring comprising two separate portions separated by a channel, and
    wherein a first portion of the O-ring is held in a first groove of the non-threaded section and a second portion of the O-ring is held in a second groove of the non-threaded section in which a portion of the second portion of the O-ring is exposed at the respective first end or second end of the body.

15. A method of assembling an electrical conduit raceway system, the method comprising:
    providing a conduit portion;
    providing a joint fitting, wherein the joint fitting comprises a sealing member positioned within a channel formed within the joint fitting;
    threading the conduit portion into the joint fitting such that a radial compressive force is applied to the sealing member causing at least a portion of the sealing member to protrude or extend from a terminal surface of a corresponding first end or second end of the joint fitting; and
    inserting an electrical wire or cable through the conduit portion and the joint fitting.

16. The method of claim 15, wherein the sealing member is an O-ring.

17. The method of claim 15, wherein a protrusion extends inwardly within the channel such that two grooves are defined in the channel.

18. The method of claim 15, wherein the sealing member comprises an O-ring comprising two separate portions separated by a channel.

19. The method of claim 15, wherein the channel is structured so as to form a U-shaped channel.

20. The method of claim 15, wherein the channel is structured so as to form an L-shaped channel that permits a portion of the sealing member to be exposed from the respective first end or the second end.

* * * * *